US008061589B2

(12) United States Patent
Cohen et al.

(10) Patent No.: US 8,061,589 B2
(45) Date of Patent: Nov. 22, 2011

(54) ELECTRONIC VOTING SYSTEM

(76) Inventors: Barry Cohen, New York, NY (US); Ira Cohen, Chicago, IL (US)

( * ) Notice: Subject to any disclaimer, the term of this patent is extended or adjusted under 35 U.S.C. 154(b) by 378 days.

(21) Appl. No.: 11/975,401

(22) Filed: Oct. 19, 2007

(65) Prior Publication Data

US 2008/0110985 A1 May 15, 2008

Related U.S. Application Data

(60) Provisional application No. 60/853,064, filed on Oct. 20, 2006.

(51) Int. Cl.
*G07C 13/00* (2006.01)
*G06K 17/00* (2006.01)
*G06F 11/00* (2006.01)
*H04L 9/32* (2006.01)

(52) U.S. Cl. ............. 235/51; 235/386; 705/12; 713/173

(58) Field of Classification Search .................... 235/51, 235/386; 705/12; 713/173
See application file for complete search history.

(56) References Cited

U.S. PATENT DOCUMENTS

| | | | | |
|---|---|---|---|---|
| 5,495,532 | A | 2/1996 | Kilian et al. | |
| 6,021,200 | A | 2/2000 | Fischer | |
| 6,092,051 | A | 7/2000 | Kilian et al. | |
| 6,317,833 | B1 | 11/2001 | Jakobsson | |
| 6,845,447 | B1 | 1/2005 | Fujioka et al. | |
| 7,099,471 | B2 | 8/2006 | Neff | |
| 7,210,617 | B2 | 5/2007 | Chaum | |
| 7,260,552 | B2 | 8/2007 | Riera Jorba et al. | |
| 7,506,159 | B2 * | 3/2009 | Shima et al. | 713/161 |
| 2002/0077887 | A1 * | 6/2002 | London Shrader et al. | 705/12 |
| 2002/0133396 | A1 * | 9/2002 | Barnhart | 705/12 |
| 2002/0161628 | A1 * | 10/2002 | Lane Poor et al. | 705/12 |
| 2004/0046021 | A1 * | 3/2004 | Chung | 235/386 |
| 2007/0106892 | A1 * | 5/2007 | Engberg | 713/168 |

OTHER PUBLICATIONS

Mark A. Herschberg, *Secure Electronic Voting Over the World Wide Web*, Submitted to the Department of Electrical Engineering and Computer Science in Partial Fulfillment of the Requirements for the Degrees of Bachelor of Science in Electrical [Computer] Science and Engineering and Master of Engineering in Electrical Engineering and Computer Science at the Massachusetts Institute of Technology, May 27, 1997, 88 pages.

R. Michael Alvarez et al., *Voting—What Is, What Could Be*, CalTech/MIT Voting Technology Project, Jul. 2001, 95 pages.

Roy G. Saltman, *Accuracy, Integrity, and Security in Computerized Vote-Tallying*, NBS Special Publication 500-158, Institute for Computer Sciences and Technology National Bureau of Standards, Gaithersburg, MD 20899 Aug. 1988, 62 pages.

Douglas W. Jones, *Evaluating Voting Technology*, Testimony before the United States Civil Rights Commission, Tallahassee, Florida, Jan. 11, 2001, Indexed on the web at http://www.cs.uiowa.edu/~jones/voting/, 11 pages.

(Continued)

*Primary Examiner* — Michael G Lee
*Assistant Examiner* — Laura Gudorf
(74) *Attorney, Agent, or Firm* — Blakely Sokoloff Taylor & Zafman LLP

(57) ABSTRACT

A method is described that involves creating a private key and a public key cryptographic key pair, generating a unique and random identifier for a voter's vote and accepting an election vote from said voter. The vote and identifier are electronically signed with the private key to create a digital signature. The vote and identifier are provided in a human readable format to the voter.

25 Claims, 11 Drawing Sheets

OTHER PUBLICATIONS

Eric A. Fischer, *Election Reform and Electronic Voting Systems (DREs):Analysis of Security Issues*, CRS Report for Congress, Nov. 4, 2003, 40 pages.
Avi Rubin, *An Election Day Clouded by Doubt*, The Baltimore Sun, Common Dreams News Center, Oct. 27, 2004, Indexed on the web at www.commondreams.org/cgi-bin/print.cgi?file=/views04/1027-25.htm, 2 pages.
Warren D. Smith, *Cryptography Meets Voting*, Sep. 10, 2005, Indexed on the web at http://www.math.temple.edu/%7Ewds/homepage/cryptovot.pdf, 64 pages.
Krishna Sampigethaya et al., *A Framework and Taxonomy for Comparison of Electronic Voting Schemes*, Computers & Security, 2005 Elsevier Ltd., vol. 25, Issue 2, Mar. 2006, pp. 137-153.
Chie Yu Lin, *Cryptography the Secret to Keeping Secrets*, Yale Scientific Magazine, Summer 2005, www.yalescientific.org, pp. 16-17.
J. Benaloh, M. Yung, *Distributing the Power of a Government to Enhance the Privacy of the Voters*, In ACM Symposium on Principles of Distributed Computing 1986, pp. 52-62.
Lorrie Faith Cranor et al., *Sensus: A Security-Conscious Electronic Polling System for the Internet*, Proceedings of the Hawai'i International Conference on System Sciences , Jan. 7-10, 1997, Wailea, Hawaii, USA, 16 pages.
Voting Systems Performance and Test Standards: An Overview, Indexed on the web at http://people.csail.mit.edu/rivest/voting/standards/vss_2002.pdf, 307 pages.
Dr. Michael A. Wertheimer, *Trusted Agent Report Diebold AccuVote-TS Voting System*, Prepared by: RABA Innovative Solution Cell (RiSC), Jan. 20, 2004, Indexed on the web at http://people.csail.mit.edu/rivest/voting/reports/2004-01-20%20RABA%20evaluation%20of%20Diebold%20AccuVote.pdf, 25 pages.
*Securing the Vote*, Election Reform Briefing, Election Reform Information Project, University of Richmond, electiononline.org, Apr. 2004, Indexed on the web at http://people.csail.mit.edu/rivest/voting/reports/2004-04-30%20ElectionLine-SecuringTheVote.pdf, 20 pages.
David Chaum, *Secret-Ballot Receipts: True Voter-Verifiable Elections*, The IEEE Computer Society, IEEE Security & Privacy, www.computer.org/security/, 1540-7993/04 © 2004, pp. 38-47.
Mercuri, Rebecca, *A Better Ballot Box?*, New Electronic Voting Systems Pose Risks as Well as Solutions, IEEE Spectrum, Oct. 2002, pp. 46-50.
Lawrence Norden, *The Machinery of Democracy: Protecting Elections in an Electronic World*, Executive Summary, Brennan Center Task Force on Voting System Security, Jun. 28, 2006, Indexed on the web at: http://www.brennancenter.org/dynamic/subpages/download_file_36340.pdf, 32 pages.
R. Michael Alvarez, *Challenges Facing the American Electoral System: Research Priorities for the Social Sciences*, The National Research Commission on Elections and Voting, A project for the Social Science Research Council, New York, http://elections.ssrc.org, Mar. 1, 2005, 20 pages.
Wm. A. Wulf, Ph. D, *Cyber Security: Beyond the Maginot Line* Statement of Wm. A. Wulf, Ph.D. President, National Academy of Engineering and AT&T Professor of Engineering and Applied Science, University of Virginia before the House Science Committee, U.S. House of Representatives Oct. 10, 2001, Indexed on the web at http://www.iwar.org.uk/cip/resources/house-oct-10-01/wulf.htm, 10 pages.
*Digital Signature Standard (DSS)*, FIPS Pub 186, Federal Information Processing Standards Publication 186, May 19, 1994, Indexed on the web at http://www.itl.nist.gov/fipspubs/fip186.htm, 17 pages.
*Four Grand Challenges in Trustworthy Computing Trustworthy Computing*, Second in a Series of Conferences on Grand Research Challenges in Computer Science and Engineering, Computing Research Association, Nov. 16-19, 2003, Indexed on the web at http://www.cra.org/reports/trustworthy.computing.pdf, pp. 1-32.
*Federal Efforts to Improve Security and Reliability of Electronic Voting Systems Are Under Way, but Key Activities Need to Be Completed*, GAO, GAO-05-956, United States Government Accountability Office: Report to Congressional Requesters, Sep. 2005, 107 pages.
Lori Minnite et al, *Securing the Vote: An Analysis of Election Fraud*, 2003 Dēmos, A Network for Ideas and Action, http://www.demos.org/pubs/EDR_-_Securing_the_Vote.pdf, 52 pages.
Ryan, P. Y. A., *Pret a Voter with Paillier Encryption*, School of Computing Science, Newcastle University, Technical Report Series, No. CS-TR-965, Jun. 2006, 16 pages.
D. Chaum, *Elections With Unconditionally-Secret Ballots and Disruption Equivalent to Breaking RSA*, in Advances in Cryptology—Eurocrypt '88 (Berlin, 1988), C. G. Gunther, Ed., vol. 330 of Lecture Notes in Computer Science, Springer-Verlag, pp. 177-182.
Rubin, Aviel D., *Brave New Ballot*, The Battle to Safeguard Democracy in the Age of Electronic Voting, New York: Morgan Road Books, 2006, pp. 265-268.
Ted Selker, *Fixing the Vote*, Scientific American, Oct. 2004, pp. 90-99.
Stefan Popoveniuc and Ben Hosp, "An Introduction to Punchscan", George Washington University—CS Department, Washington DC 20052, Oct. 15, 2006, pp. 1-14.
Kevin Fisher, Richard Carback and Alan T. Sherman, "Punchscan: Introduction and System Definition of a High-Integrity Election System," Center for Information Security and Assurance (CISA) Department of Computer Science and Electrical Engineering University of Maryland, Baltimore County (UMBC), May 2006, 8 pages.
C. Andrew Neff, "A Comparison of Methodologies and Their Relative Effectiveness at Achieving It," VoteHere, Inc., Revision 6, Dec. 17, 2003, pp. 1-12.
Tadayoshi Kohno, Adam Stubblefield, Aviel Rubin and Dan S. Wallach, "Analysis of an Electronic Voting System," Jul. 23, 2003, pp. 1-24.
Douglas W. Jones, "A Brief Illustrated History of Voting," Part of the Voting and Election Web Pages, The University of Iowa Department of Computer Science, Copyright 2001 updated 2003, pp. 1-14.
"Digital Signature Standard (DSS)," Federal Information Processing Standards Publication 186, May 19, 1994, pp. 1-17.
Ariel J. Feldman, J. Alex Halderman and Edward W. Felten, "Security Analysis of the Diebold AccuVote-TS Voting Machine," Princeton University, Sep. 13, 2006, pp. 1-24.

* cited by examiner

ELECTRONIC VOTING SYSTEM

CLAIM TO PRIORITY

The present application claims priority to, and the benefit of the filing date of, U.S. provisional application 60/853,064 filed on Oct. 20, 2006.

BACKGROUND

Voting is one of the hallmarks of democracy, but counting votes or ballots is a perennial problem. Recent elections have been marred by controversies suggesting that ballots were improperly counted in various statewide and national races in the United States, and allegations of theft of elections occur regularly in other parts of the world. Election monitors are a regular feature in many parts of the world.

Historically, certain types of election systems have allowed for play within the system—the ability to change the outcome of a close election by committing election fraud in difficult to detect ways. Allegations of election fraud have played a part in many historical elections, not least of which was the close national race between Kennedy and Nixon in 1960. Moreover, machine politics has a long and colorful history in general, with suggestions that political machines could and did throw elections to favored candidates, whether honestly or dishonestly. It has also been suggested that some machines routinely throw elections where no risk exists, merely to keep the machine working effectively.

Problems with counting ballots corrode the system in a variety of ways. Voters can be discouraged from voting and thereby exercising rights due to a belief that a vote will not count. Election supervisors experience poor morale due to allegations of fraud or incompetence brought on by problems with voting—whether legitimate or not. Any discretion accorded to the person counting votes provides power, but also provides an opening for criticism about use of such discretion.

Thus, it may be useful to provide a voting system which eliminates most forms of discretion and judgment—that related to whether to count a ballot due to issues such as processing of a ballot or questions about voter intent. Technology potentially provides a solution to such problems. However, many technological solutions lack features desirable for a robust and complete voting system. Thus, it may be desirable to provide a system which allows for an auditable record of votes and public access to vote information.

BRIEF DESCRIPTION OF THE DRAWINGS

The present invention is illustrated by way of example in the accompanying drawings. The drawings should be understood as illustrative rather than limiting.

DETAILED DESCRIPTION

A system, method and apparatus is provided for an electronic voting system. The specific embodiments described in this document represent examples or embodiments of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

Figure 1:
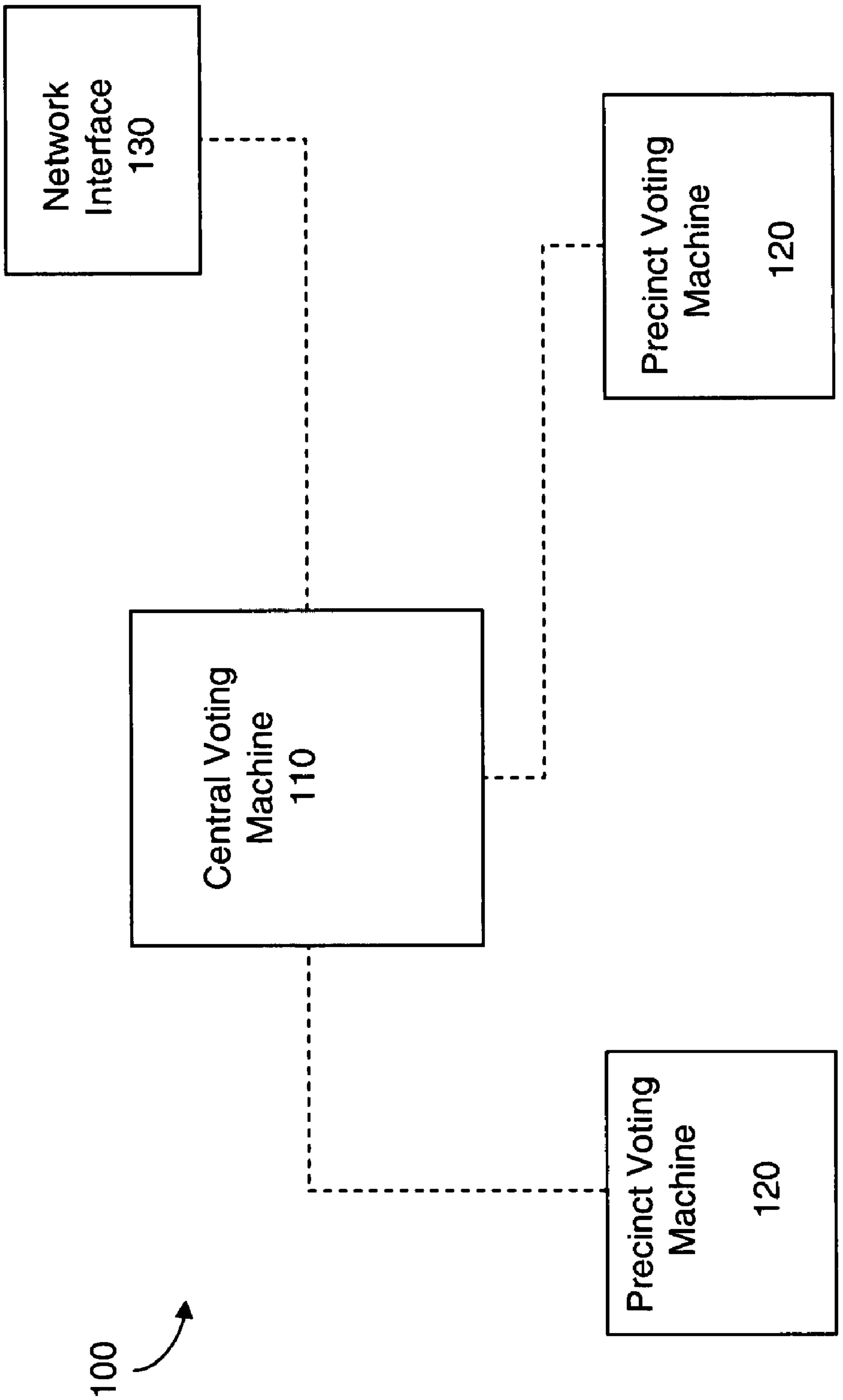
FIG. 1 illustrates an embodiment of an electronic voting system.

FIG. 1 illustrates an embodiment of an electronic voting system. System 100 includes a central voting machine, a set of precinct voting machines and potentially a network interface. Central voting machine 110 provides a central machine or set of machines used by an election authority (e.g. a Secretary of State or Supervisor of Elections) to tabulate votes and provide vote totals. Precinct voting machines 120 provide individual machines used at voting locations (e.g. precincts)—the machines voters use to cast their votes. A network interface 130 is provided for those systems where access to information for the outside world is desired. However, each linkage shown here may be provided through secure means, or may simply exist solely for purposes of one-way transfer of information (e.g. from precinct to central authority or from central authority to network). Thus, the linkages may be provided through physical transfers of media embodying information, rather than through a dedicated or existing physical coupling. In some embodiments, the central voting machine 110 may only receive data in transportable media from the precinct voting machines, and then may produce results data which can be transferred on other transportable media to a machine used as a network interface 130.

Figure 2:
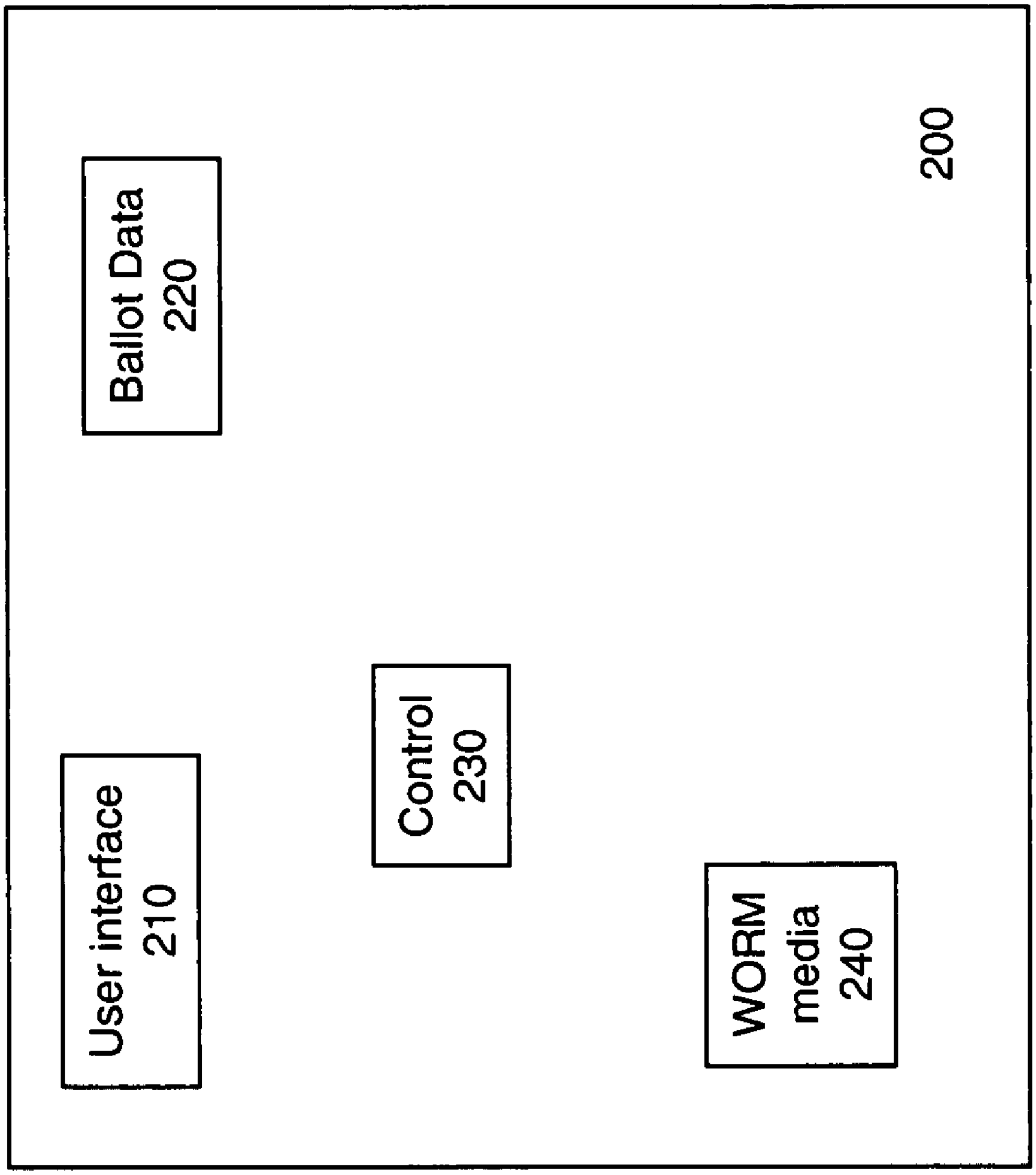
FIG. 2 illustrates an embodiment of a precinct voting machine.

Particular details of the various components of the system may provide further understanding of the system. FIG. 2 illustrates an embodiment of a precinct voting machine. Precinct voting machine 200 includes a user interface, ballot data, a control module and WORM (write-once, read-many) media. Ballot data 220 may provide information about the ballot used in the current election—or each of a set of ballots used for different voters in a given election. Thus, ballot data 220 may provide formats, candidate names, information about candidates or measures, and types of votes (e.g. yes/no, choose one, choose 2 of 5 candidates), etc. User interface 210 may provide a presentation of data to a user in a graphical or other form (accessible systems may use sound or other presentation methods), and may also accept user input, such as selections of choices, requests for information, or indications of completion, for example. Thus, user interface 210 may include a touch screen, speakers, and other input and/or output devices. WORM media 240 provides a storage medium on which ballots may be stored. Such storage may involve storage of the ballot as a collection of votes along with a random identifier, with the ballot digitally signed through use of a public-private key pair. Moreover, the ballot may be stored randomly on the WORM media 240 to avoid indications of which ballot matches a given voter. Control module 230 may coordinate actions of the other components, causing user interface 210 to display ballot data 220 correctly and causing a completed ballot to be stored via WORM media 240.

Figure 3:
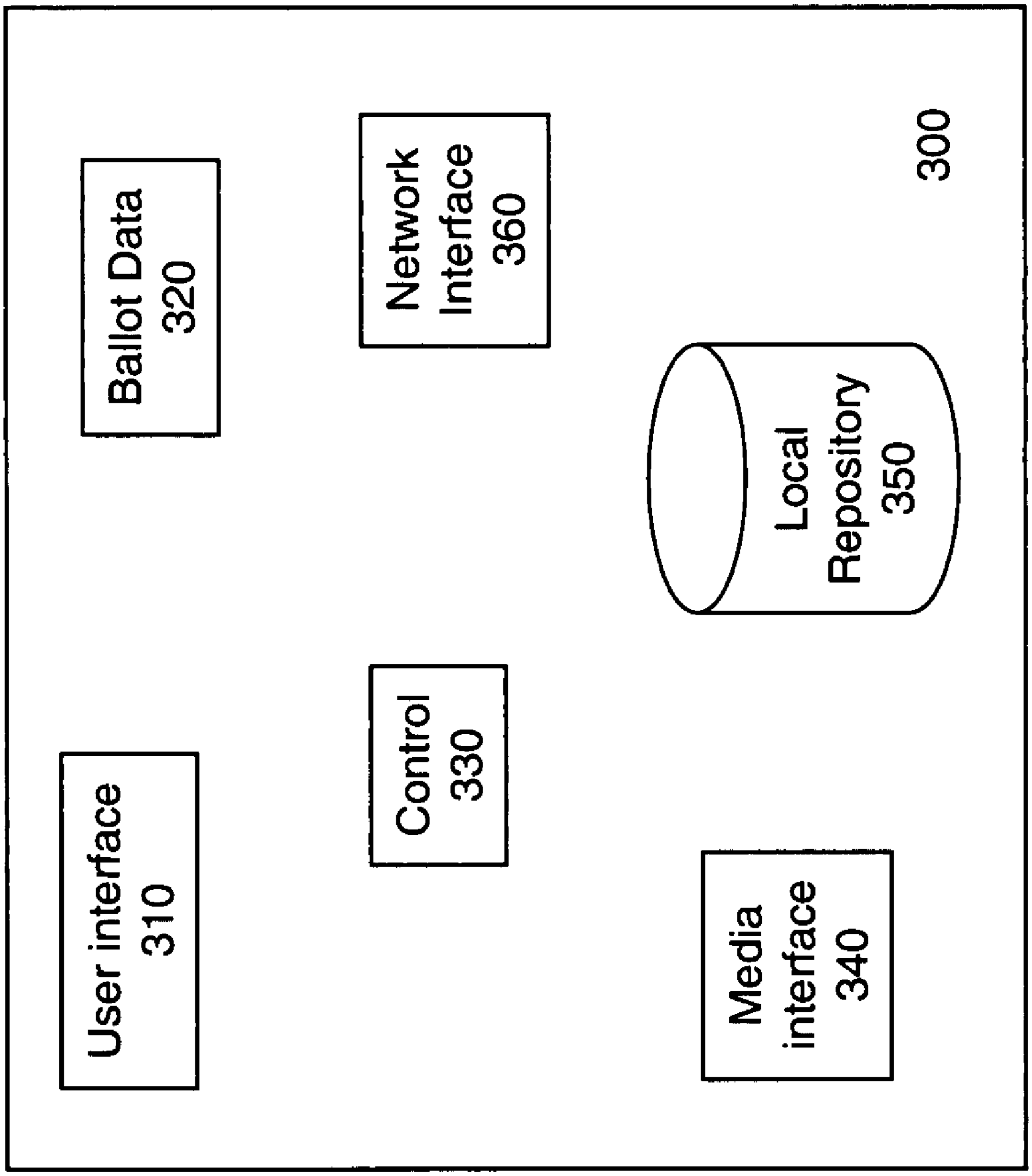
FIG. 3 illustrates an embodiment of a central voting system.

While the precinct voting machine is used to record votes, the central voting machine is used to tabulate total results. FIG. 3 illustrates an embodiment of a central voting system. System 300 includes a user interface, ballot data, a media interface, a local repository, a network interface and a control module. User interface 310, similarly to user interface 210, allows for interaction with a user, displaying data related to received ballot records and accepting user input instructing the system on how to proceed. Ballot data 320 may be used to interpret the data embodied in a machine-readable medium. Media interface 340 may accept as input WORM media from a precinct voting machine and read data embodied therein—allowing for tallying of votes and comparison of data with ballot data 320. Local repository 350 may be used to store the data retrieved from the various WORM media and to make that data accessible. Network interface 360 may be used to make tallied data available for publication on the internet or other forms of dissemination to the public. Note that network interface 360 may involve a media interface such as a disk drive or FLASH drive on which data is recorded—and from which media may be removed for transfer to a networked machine. Alternatively, network interface 360 may be a traditional interface to a network such as a network card or bus interface, for example. Control module 330 may be used to coordinate activities of the various modules and to order execution of instructions.

Figure 4A:
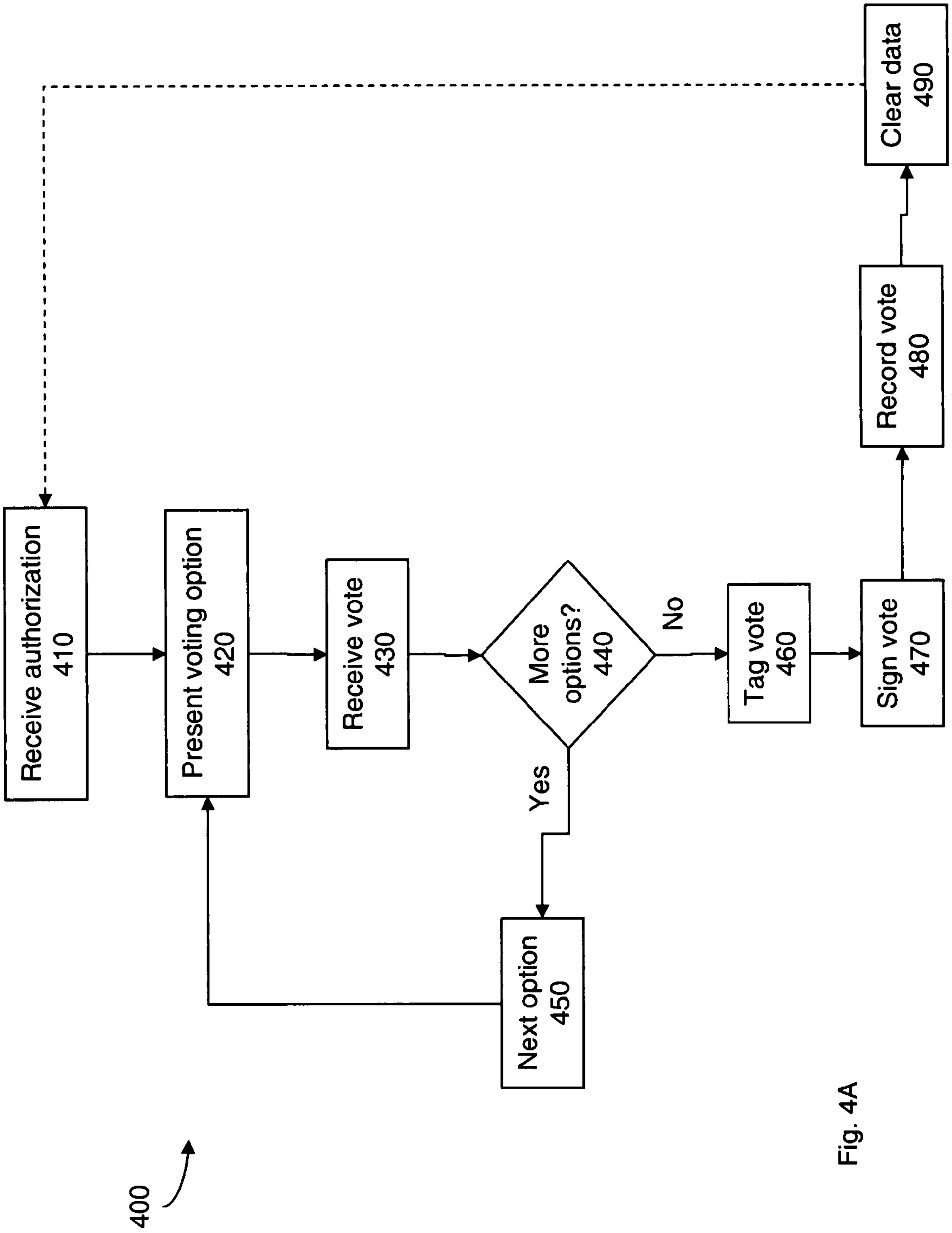
FIG. 4A illustrates an embodiment of a process of receiving a vote.

Various processes may be carried out by the systems described, or other embodiments of such systems. FIG. 4A illustrates an embodiment of a process of receiving a vote. Process 400 includes receiving authorization for voting, presenting a voting option, receiving a vote, determining if more votes are available and proceeding to the next voting option, tagging a vote, signing the vote, recording the vote and clearing data in a voting machine. Process 400 and other processes of this document are implemented as a set of modules, which may be process modules or operations, software modules with associated functions or effects, hardware modules designed to fulfill the process operations, or some combination of the various types of modules, for example. The modules of process 400 and other processes described herein may be rearranged, such as in a parallel or serial fashion, and may be reordered, combined, or subdivided in various embodiments.

At module 410, a voting machine is authorized to accept votes, such as when a poll worker accepts a voter's identification (according to whatever standards are in effect) and enables a machine, for example. At module 420, a voting option is presented, such as a set of candidates for an office or a ballot measure and yes or no options, for example. This may involve retrieving ballot data specified when voting was authorized based on what elections a voter is eligible to vote in. At module 430, a vote is received from the voter (including an indication not to record a vote, for example). At module 440, a determination is made as to whether more options are available. If yes, the process moves to the next option (or set of options) at module 450, and returns to presentation at module 420.

If no options remain, the vote or set of votes (ballot) is tagged at module 460 with a unique identification number. Such a unique identification number may be generated to uniquely identify the ballot and render it traceable, without tying the identification number to the voter. Thus, the unique identification number may be seeded with a time of day of balloting and may include information about the precinct and voting machine, while ultimately being randomly generated in whole or in part. The vote or ballot with the unique identification number is signed digitally at module 470, using a private key of a public-private key pair. The key pair may be generated by the voting machine for the voting session, with the private key discarded when all votes are cast and the public key recorded with the votes.

At module 480, the vote or ballot is recorded, such as on write-once media. If the ballot is recorded in a relatively random location, this may prevent indications of who cast the ballot—for example, random locations on a removable medium may be divided into sectors with a map indicating which sectors are occupied. The ballot may be recorded at a randomly selected unoccupied sector, and the map updated to flag that the sector is now occupied. Recording the vote also involves producing a paper receipt for the voter and for the election authority as well. At module 490, temporary memory (operating memory) of the voting machine is cleared, so the stored ballot is the only electronic record of the votes and succeeding votes from other voters do not mesh in memory with previous votes. The process may then begin again for the next voter, for example.

With ballots cast, the process of tallying votes can begin. One may expect that reports indicating a count of votes for each voting machine or each precinct may be produced, providing auditable trails and fallback copies of records. Similarly, information about public keys may be produced in paper and electronic form to allow future authentication of results. However, actually counting ballots should be made simpler by use of technology—thus the WORM media may be used as the primary copy of a ballot for counting (or initial counting) purposes.

Figure 4B:
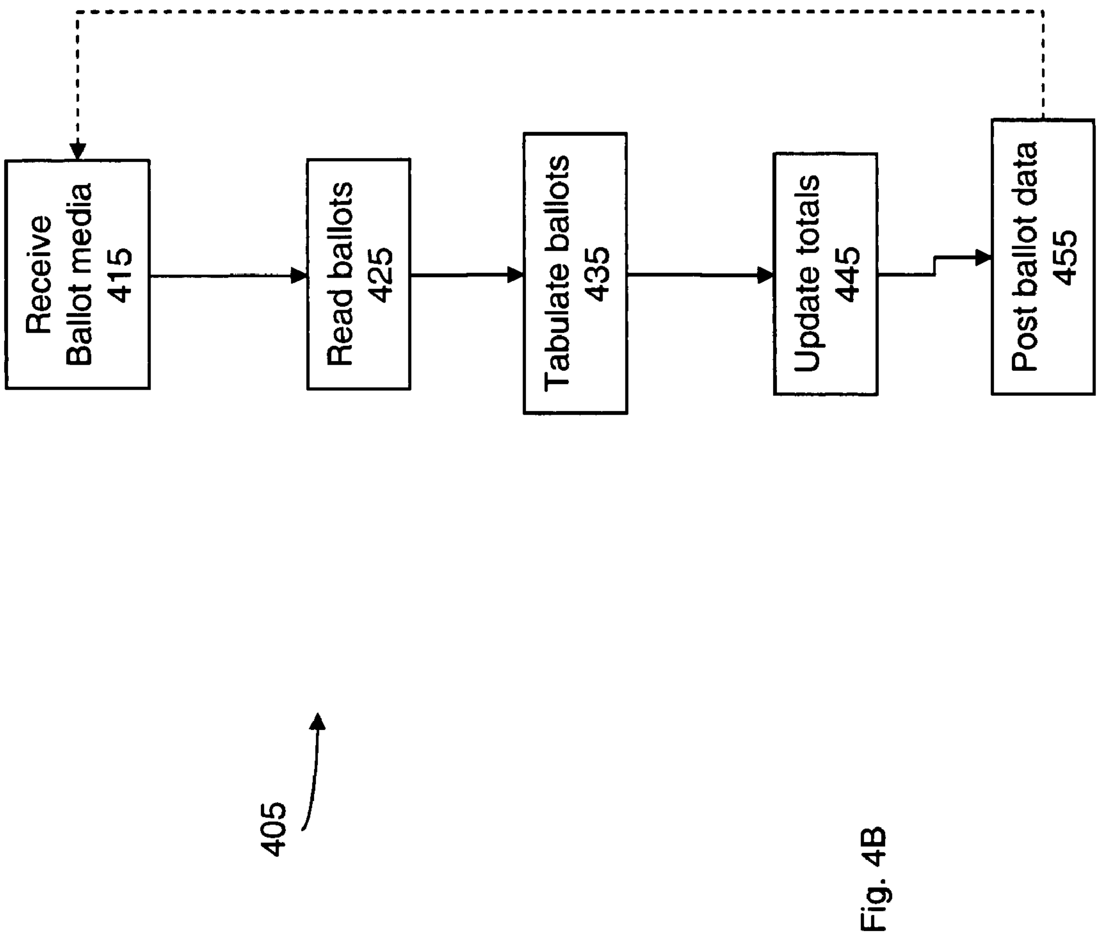
FIG. 4B illustrates an embodiment of a process of counting a vote.

FIG. 4B illustrates an embodiment of a process of counting a vote. Process 405 includes receiving ballot media, reading ballots, tabulating the ballots, updating totals, and posting ballot data. Ballot media is received at module 415—such as when a precinct voting machine arrives for tabulation at a central voting authority. Opening a sealed machine may involve various integrity checks, or a ballot medium may be presented by poll workers with the poll workers certifying its authenticity, for example. The ballots of the ballot media are read at module 425, determining what data is included therein. At module 435, the ballots are tabulated—this may involve checking totals against written records from a precinct, for example, along with simple totaling of results. Overall totals for an election are updated at module 445, including the tabulated data from the ballot media of module 415. The ballot data is then posted publicly at module 455, such as at an internet-accessible website. As mentioned above with respect to FIG. 3, this may involve a direct connection to a network, or providing the data embodied in a medium for reading by a machine coupled to a network, for example.

Figure 5:
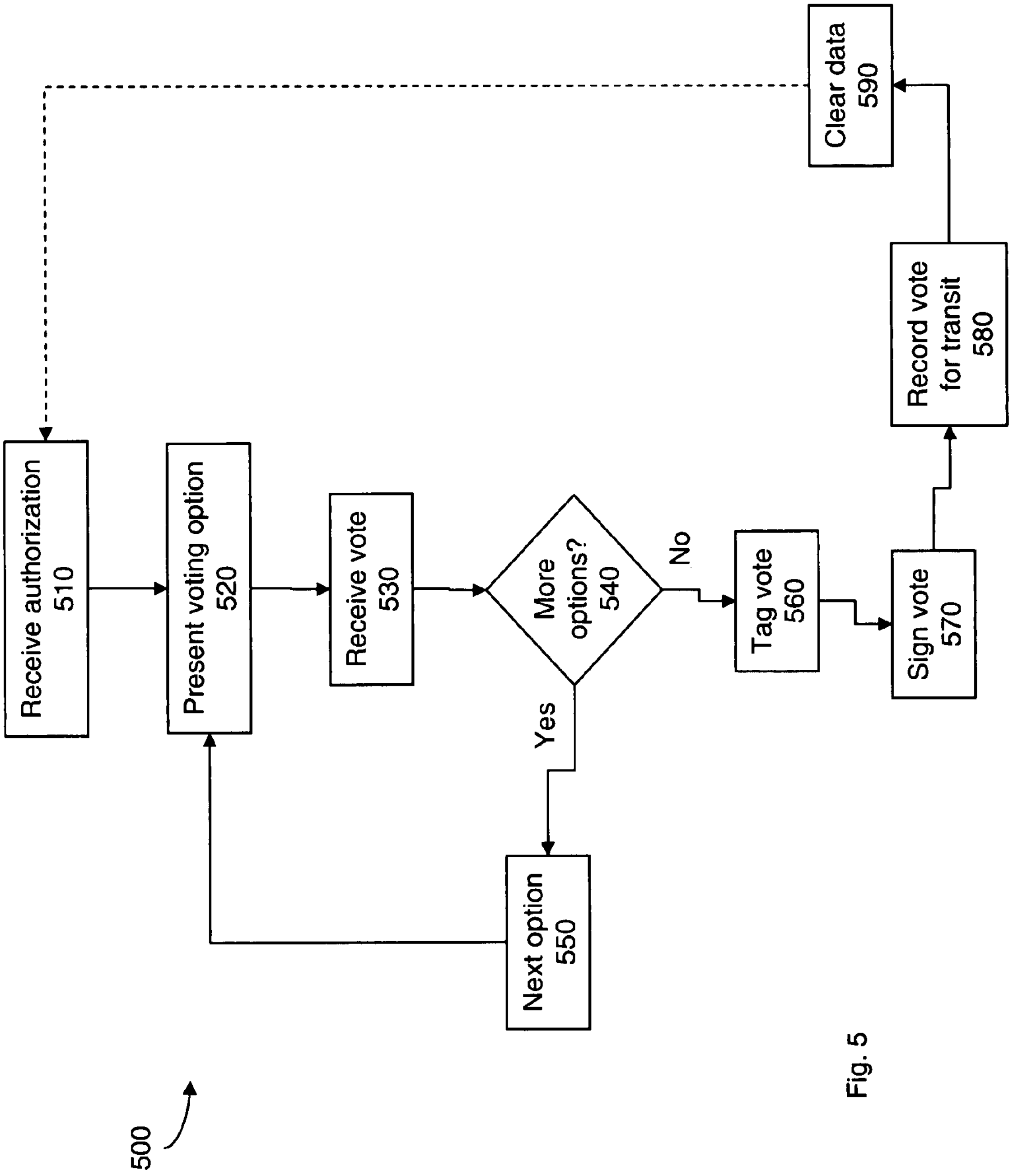
FIG. 5 illustrates an embodiment of a process of receiving an absentee vote.

While voting at a precinct is the classic model, absentee voting may also be accomplished. FIG. 5 illustrates an embodiment of a process of receiving an absentee vote. Process 500, similarly to process 400, provides a process for capturing an absentee vote. At module 510, a voting machine is authorized to accept votes, such as when a poll worker accepts a voter's identification (according to whatever standards are in effect) and enables a machine, for example. This may involve selecting a home precinct for a voter and other voter-specific information (e.g. eligibility to vote on measures affecting property in a property district, for example). A voting option is presented at module 520, such as a set of candidates for an office or a ballot measure and yes or no options, for example. A vote is received from the voter (including an indication not to record a vote, for example) at module 530. A determination is made as to whether more options are available at module 540—whether voter has more measures or candidates to vote on. If yes, the process moves to the next option (or set of options) at module 550, and returns to option presentation at module 520.

If no options remain, at module 560, the vote or set of votes (ballot) is tagged with a unique identification number similar to that described with respect to module 460. At module 570, the vote or ballot with the unique identification number is signed digitally, using a private key of a public-private key pair. The key pair may be generated by the voting machine for the voting session, with the private key discarded when all votes are cast and the public key recorded with the votes.

At module 580, the vote or ballot is recorded, such as on write-once media. This media is provided for transport to the home precinct of the voter—so it is identifiable at this point. Recording the vote also involves producing a paper receipt for the voter and for the election authority as well—the paper receipt and the media are packaged for transit to the home precinct of the voter and sent, the voter keeps a copy of the receipt, and a third copy may be kept for the absentee voting authority. At module 590, temporary memory (operating memory) of the voting machine is cleared, so the stored ballot is the only electronic record of the votes and succeeding votes from other voters do not interact or overlap in memory with previous votes. The process may then begin again for the next voter, for example.

Figure 6:
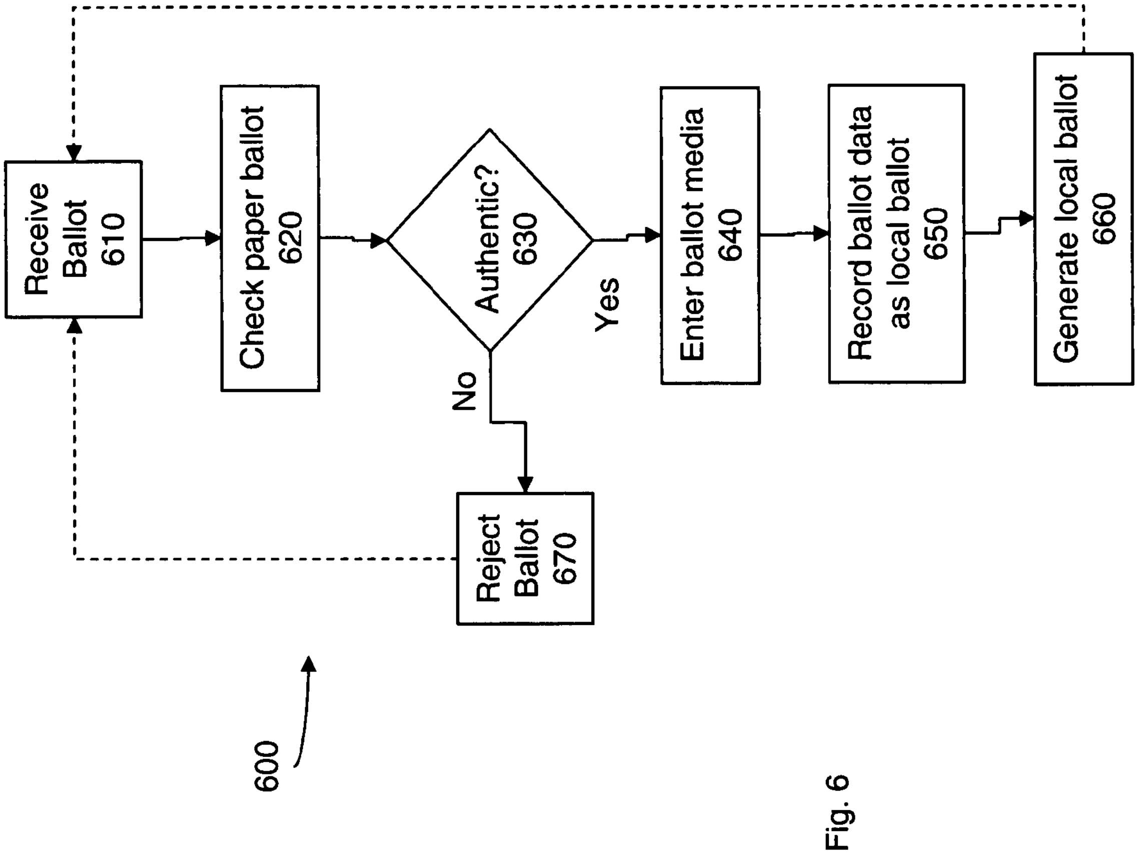
FIG. 6 illustrates an embodiment of a process of converting an absentee vote.

With absentee ballots cast, they must then be incorporated into the ultimate election tally. This may be done by including the absentee ballots in the precinct balloting on election day in some embodiments, or by using a separate voting machine to make a local ballot from the absentee ballot. FIG. 6 illustrates an embodiment of a process of converting an absentee vote. Process 600 includes receiving an absentee ballot, checking the paper ballot for authenticity (e.g. the voter is on the rolls for the precinct), verifying authenticity and rejecting the ballot if necessary, entering the ballot media into a voting machine, recording the ballot data as a local ballot, and generating a local ballot therefrom.

Thus, process 600 initiates with receipt of an absentee ballot at module 610. At module 620, a poll worker or other election staffer checks the application for ballot to determine if the voter is eligible, the ballot is in proper form (votes in current election measures, for example), and any other requirements are complied with. At module 630, a determination is made as to whether the absentee ballot is authentic based on this check. If no, the ballot is rejected at module 670, and the corresponding identifying information is recorded with an indication that the ballot was not counted. This may later be accessed to verify the result of the ballot in case of questions—and would be accessible based on the paper copy of the receipt kept by the voter, for example.

If the ballot is acceptable, the votes are to be recorded. At module 640, the ballot media is entered into the voting machine. The ballot data is recorded as a local ballot at module 650—such as by reading the data from the absentee ballot media and recording it as a set of votes on a local voting machine. At module 660, the local ballot is then generated in much the same way a ballot is generated in a local machine when a voter actually interacts with the machine—through the process 400 of FIG. 4, for example. Thus, an absentee ballot has a unique identification number for the local precinct voting machine associated with it, and tracing of the vote from the absentee ballot (with its unique identification number) to the local ballot and thence to published results may occur. Moreover, while absentee balloting is contemplated for remote locations (e.g. at embassies in foreign countries or in large cities), this technique may also be used to bring voting machines to confined (e.g. bedridden) individuals or to individuals on military bases or ships at sea, for example.

Figure 7:
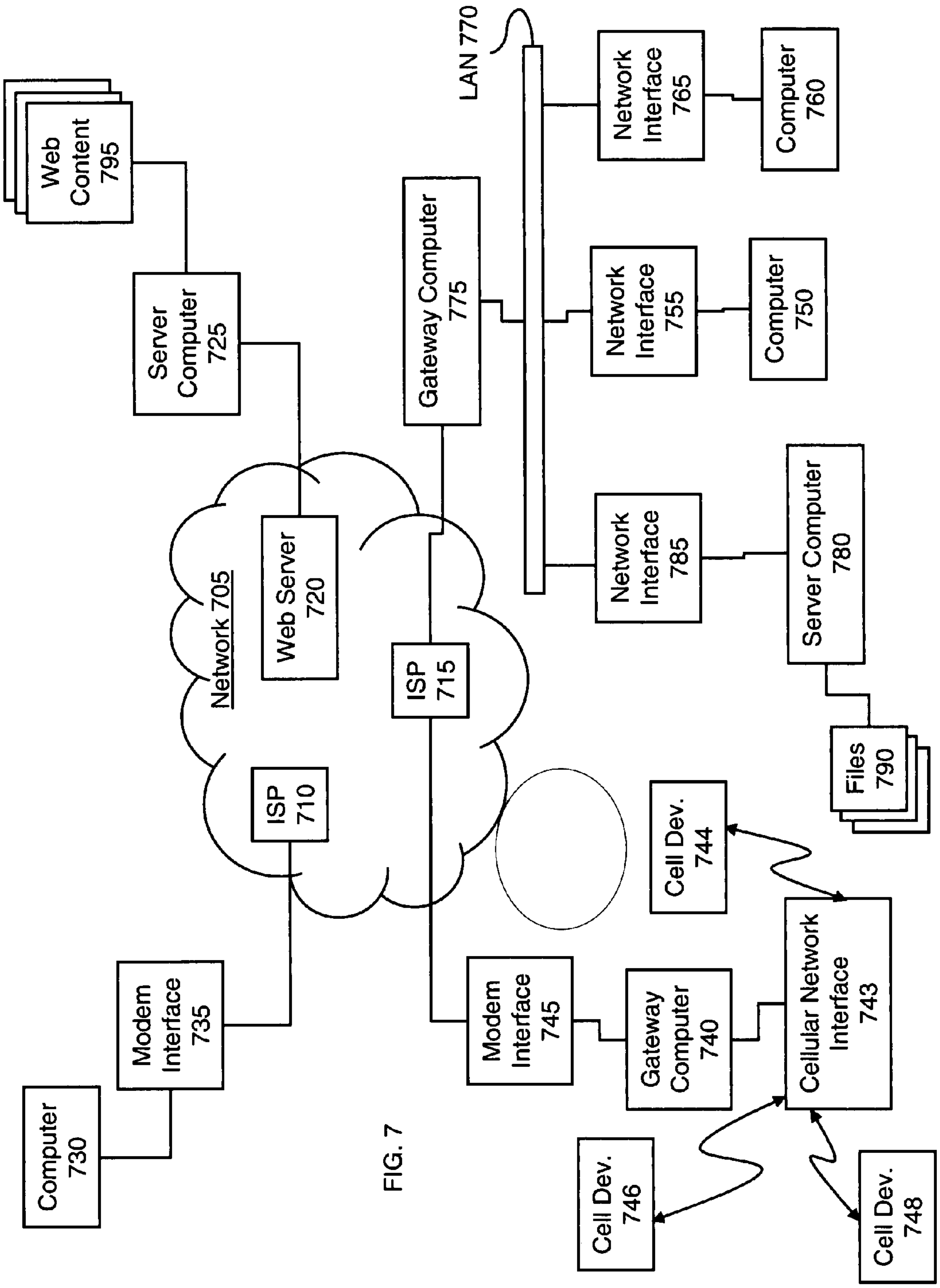
FIG. 7 illustrates an embodiment of a network which may be used with an electronic voting system.
Figure 8:
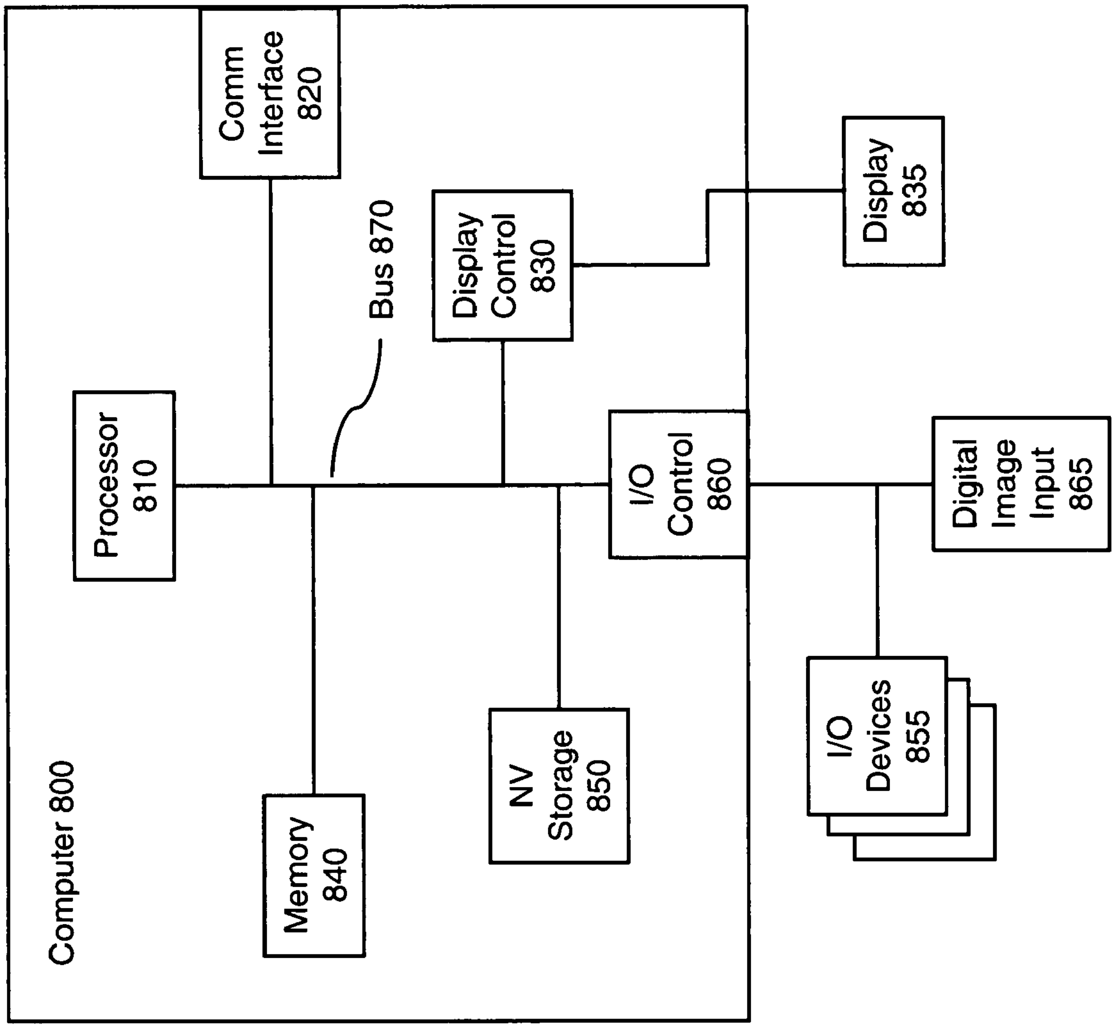
FIG. 8 illustrates an embodiment of a machine which may be used with or as part of an electronic voting system.

Various systems may be used to execute the processes described above, or as variants of the systems described above. FIG. 7 illustrates an embodiment of a network which may be used with an electronic voting system. FIG. 8 illustrates an embodiment of a machine which may be used with or as part of an electronic voting system. The following description of FIGS. 7-8 is intended to provide an overview of device hardware and other operating components suitable for performing the methods of the invention described above and hereafter, but is not intended to limit the applicable environments. Similarly, the hardware and other operating components may be suitable as part of the apparatuses described above. The invention can be practiced with other system configurations, including personal computers, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. Note that in some instances, network communications may not be provided for voting machines, but posting information on the internet would require network connectivity elsewhere, for example.

FIG. 7 shows several computer systems that are coupled together through a network 705, such as the internet, along with a cellular or other wireless network and related cellular or other wireless devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 705 is typically provided by internet service providers (ISP), such as the ISPs 710 and 715. Users on client systems, such as client computer systems 730, 750, and 760 obtain access to the internet through the internet service providers, such as ISPs 710 and 715. Access to the internet allows users of the client computer systems to exchange information, receive and send e-mails, and view documents, such as documents which have been prepared in the HTML format. These documents are often provided by web servers, such as web server 720 which is considered to be "on" the internet. Often these web servers are provided by the ISPs, such as ISP 710, although a computer system can be set up and connected to the internet without that system also being an ISP.

The web server 720 is typically at least one computer system which operates as a server computer system and is configured to operate with the protocols of the world wide web and is coupled to the internet. Optionally, the web server 720 can be part of an ISP which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Cellular network interface 743 provides an interface between a cellular network and corresponding cellular devices 744, 746 and 748 on one side, and network 705 on the other side. Thus cellular devices 744, 746 and 748, which may be personal devices including cellular telephones, two-way pagers, personal digital assistants or other similar devices, may connect with network 705 and exchange information such as email, content, or HTTP-formatted data, for example.

Cellular network interface 743 is representative of wireless networking in general. In various embodiments, such an interface may also be implemented as a wireless interface such as a Bluetooth interface, IEEE 802.11 interface, or some other form of wireless network. Similarly, devices such as devices 744, 746 and 748 may be implemented to communicate via the Bluetooth or 802.11 protocols, for example. Other dedicated wireless networks may also be implemented in a similar fashion.

Cellular network interface 743 is coupled to computer 740, which communicates with network 705 through modem interface 745. Computer 740 may be a personal computer, server computer or the like, and serves as a gateway. Thus, computer 740 may be similar to client computers 750 and 760 or to gateway computer 775, for example. Software or content may then be uploaded or downloaded through the connection provided by interface 743, computer 740 and modem 745.

Client computer systems 730, 750, and 760 can each, with the appropriate web browsing software, view HTML pages provided by the web server 720. The ISP 710 provides internet connectivity to the client computer system 730 through the modem interface 735 which can be considered part of the client computer system 730. The client computer system can be a personal computer system, a network computer, a web TV system, or other such computer system.

Similarly, the ISP 715 provides internet connectivity for client systems 750 and 760, although as shown in FIG. 7, the connections are not the same as for more directly connected computer systems. Client computer systems 750 and 760 are part of a LAN coupled through a gateway computer 775. While FIG. 7 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be Ethernet network or other network interfaces. The LAN 770 is also coupled to a gateway computer system 775 which can provide firewall and other internet related services for the local area network. This gateway computer system 775 is coupled to the ISP 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the internet through the gateway system 775.

FIG. 8 shows one example of a personal device that can be used as a cellular telephone (744, 746 or 748) or similar personal device, or may be used as a more conventional personal computer, as an embedded processor or local console, or as a PDA, for example. Such a device can be used to perform many functions depending on implementation, such as monitoring functions, user interface functions, telephone communications, two-way pager communications, personal organizing, or similar functions. The system 800 of FIG. 8 may also be used to implement other devices such as a personal computer, network computer, or other similar systems. The computer system 800 interfaces to external systems through the communications interface 820. In a cellular telephone, this interface is typically a radio interface for communication with a cellular network, and may also include some form of cabled interface for use with an immediately available personal computer. In a two-way pager, the communications interface 820 is typically a radio interface for communication with a data transmission network, but may similarly include a cabled or cradled interface as well. In a personal digital assistant, communications interface 820 typically includes a cradled or cabled interface, and may also include some form of radio interface such as a Bluetooth or 802.11 interface, or a cellular radio interface for example.

The computer system 800 includes a processor 810, which can be a conventional microprocessor such as an Intel Pentium microprocessor or Motorola power PC microprocessor, a Texas Instruments digital signal processor, or some combination of the various types or processors. Memory 840 is coupled to the processor 810 by a bus 870. Memory 840 can be dynamic random access memory (dram) and can also include static ram (sram), or may include FLASH EEPROM, too. The bus 870 couples the processor 810 to the memory 840, also to non-volatile storage 850, to display controller 830, and to the input/output (I/O) controller 860. Note that the display controller 830 and I/O controller 860 may be integrated together, and the display may also provide input.

The display controller 830 controls in the conventional manner a display on a display device 835 which typically is a liquid crystal display (LCD) or similar flat-panel, small form factor display. The input/output devices 855 can include a keyboard, or stylus and touch-screen, and may sometimes be extended to include disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the device 800.

The non-volatile storage 850 is often a FLASH memory or read-only memory, or some combination of the two. A magnetic hard disk, an optical disk, or another form of storage for large amounts of data may also be used in some embodiments, though the form factors for such devices typically preclude installation as a permanent component of the device 800. Rather, a mass storage device on another computer is typically used in conjunction with the more limited storage of the device 800. Some of this data is often written, by a direct memory access process, into memory 840 during execution of software in the device 800. One of skill in the art will immediately recognize that the terms "machine-readable medium" or "computer-readable medium" includes any type of storage device that is accessible by the processor 810 and also encompasses a carrier wave that encodes a data signal.

The device 800 is one example of many possible devices which have different architectures. For example, devices based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

In addition, the device 800 is controlled by operating system software which includes a file management system, such as a disk operating system, which is part of the operating system software. One example of an operating system software with its associated file management system software is the family of operating systems known as Windows CE® and Windows® from Microsoft Corporation of Redmond, Wash., and their associated file management systems. Another example of an operating system software with its associated file management system software is the Palm® operating system and its associated file management system. The file management system is typically stored in the non-volatile storage 850 and causes the processor 810 to execute the various acts required by the operating system to input and output data and to store data in memory, including storing files on the non-volatile storage 850. Other operating systems may be provided by makers of devices, and those operating systems typically will have device-specific features which are not part of similar operating systems on similar devices. Similarly, WinCE® or Palm® operating systems may be adapted to specific devices for specific device capabilities.

Device 800 may be integrated onto a single chip or set of chips in some embodiments, and typically is fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 9:
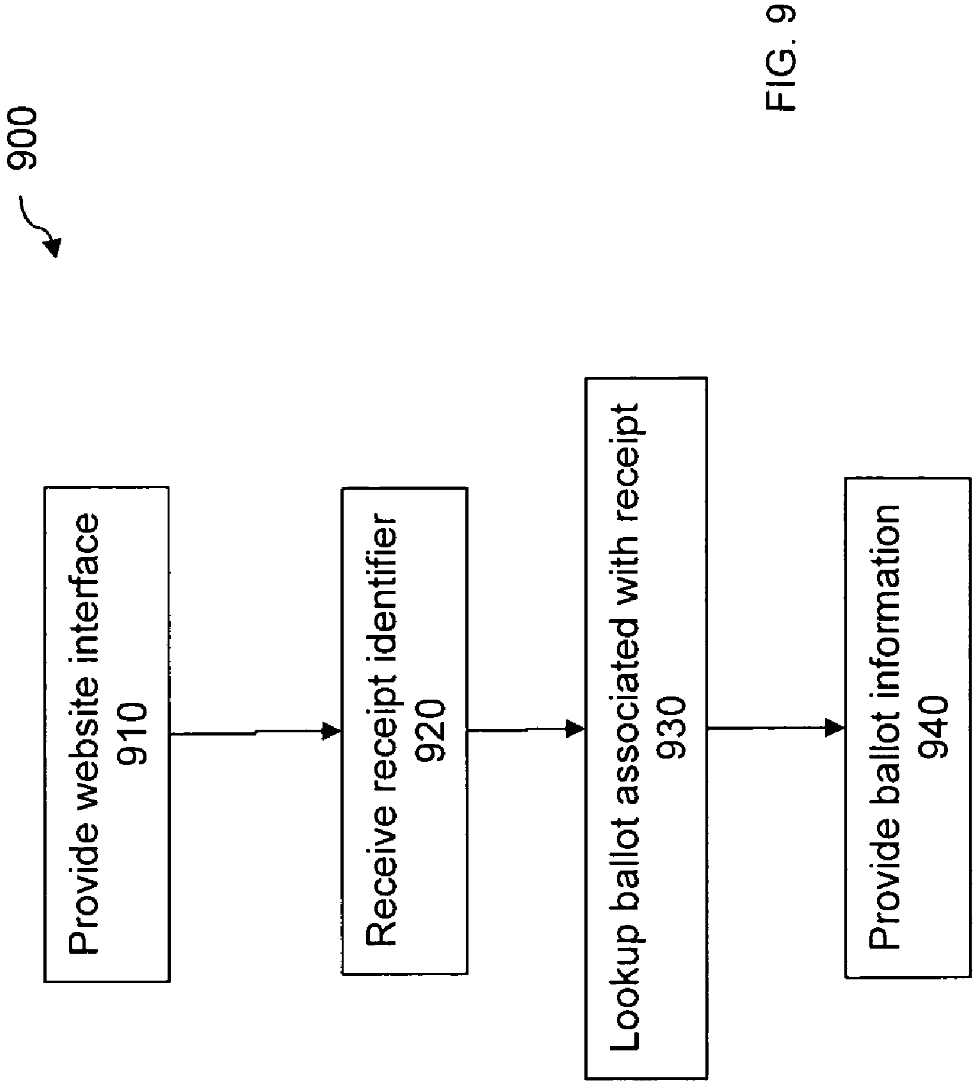
FIG. 9 illustrates an embodiment of a process of checking a vote.

One aspect of the system not already described is the process for verifying a vote was counted. FIG. 9 illustrates an embodiment of a process of checking a vote. Process 900 includes providing a website interface, receiving a receipt identifier, looking up a ballot associated with the receipt identifier, the process initiates at module 910 by providing a website interface. This interface may allow a voter to enter an encoded number from a receipt, or scan a barcode from a receipt for example. At module 920, the receipt identifier is received. The process looks up the associated ballot at module 930, which reports one of three possible results: i) no ballot with the specified ID exists in the database; ii) a ballot with the specified ID was marked but not cast because the (absentee or provisional) voter was not qualified; iii) a ballot with the specified ID was cast and the ballot is displayed. Thus, a voter may retrieve information related to a cast ballot 940, verify its accuracy and determine if the ballot was counted after the election.

The election authority website "publishes" ballots collected by a voting machine during a voting session (e.g., by making them publicly available). Moreover, each ballot has a customized signature, and, the voting machine creates a single prinate/public key pair for the (potentially) large number of ballots that it records during the voting session. The website also publishes the public key (created by the voting machine) so that verification of the ballots recorded by the machine can be made by any member of the public. The election authority web site also publishes all the source code and executable code, and a sufficiently detailed description of the method of deriving the executable from the source to permit a third party to duplicate the result, including the computing platform, tools and settings the ballot templates used on each machine, all the associated public keys, and all ballots cast. The ballot that has been filled out by a voter and post-processed and stored by the voting machine may be referred to as the "signed, tagged, anonymous record" (STAR). That is, this ballot has a random identifier and a digital signature that identify it and certify its content, but no connection with the identity of any voter (hence, the "anonymous"). This record is what is stored on the machine WORM, given to the voter, a paper copy is retained by the voting authority and published on the internet.

The system provides that anyone can download any ballot and the associated public key for that voting session and check that the signature on the ballot corresponds to the session public key and the ballot content. The system also provides that anyone can download an entire set of STAR ballots and public keys for any electoral jurisdiction, up to and including an entire state (or all states). This will enable third parties to conduct an automated of check the correctness of each ballot and also to conduct their own tally of the votes for any office or issue.

Figure 10:
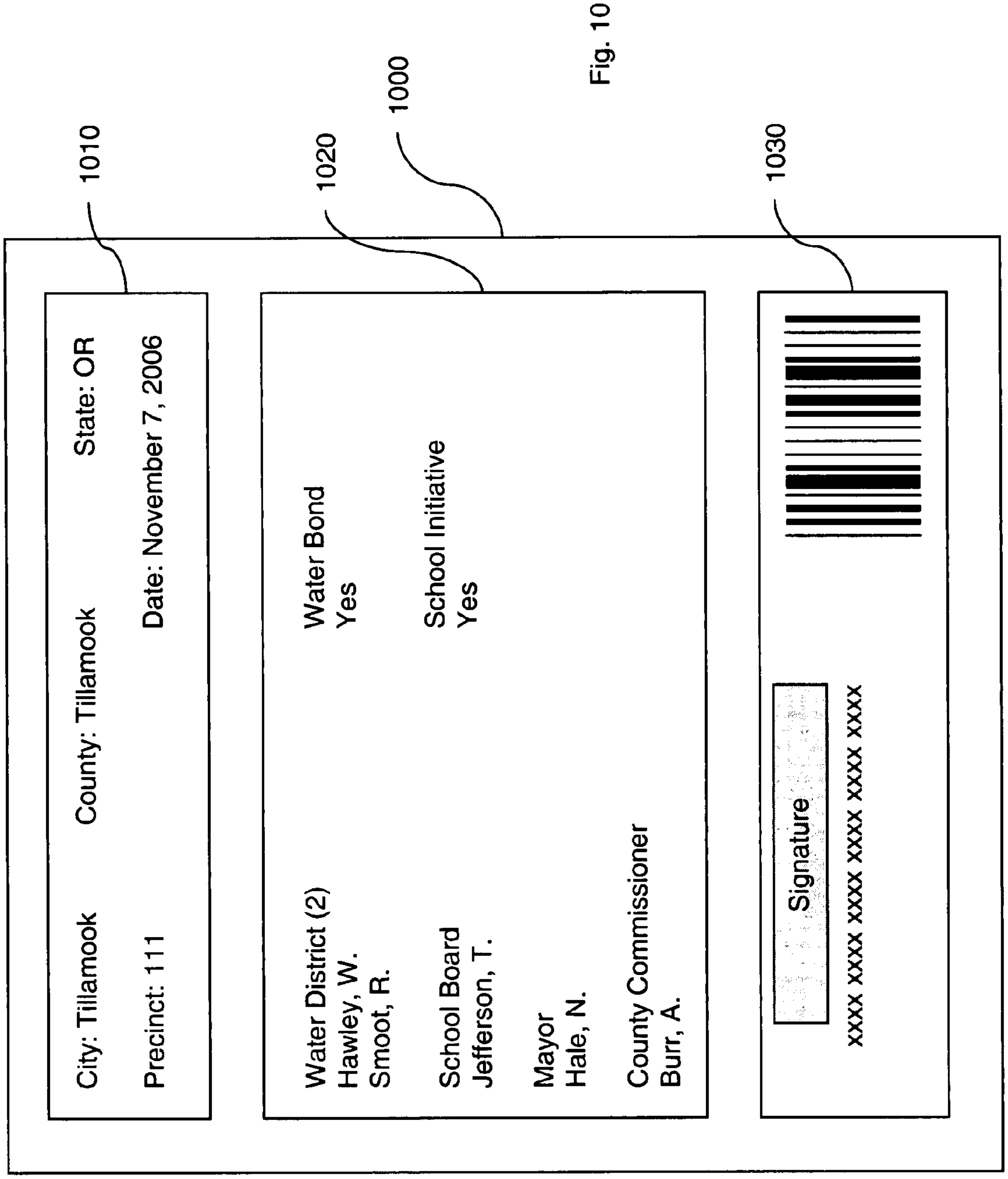
FIG. 10 illustrates an embodiment of a certificate used to evidence a vote.

For the system to work, a certificate or receipt needs to be provided to a voter with recorded votes available. FIG. 10 illustrates an embodiment of a certificate used to evidence a vote. One embodiment of such a certificate is certificate 1000, but many other embodiments may provide sufficient voting information for such a system. Certificate 1000 includes an election information section 1010, a vote section 1020 and an encoded section 1030. Election information section 1010 provides information about the election in which the voter voted—such as location, date, precinct, voting machine, etc. Vote section 1020 provides information about recorded votes for the ballot corresponding to the certificate 1000. Thus, one may determine what votes should have been recorded by the voting machine for the certificate 1000 by inspecting vote section 1020. Encoded section 1030 provides verification information including a ramdomly generated identifier. For example, a digitally signed numeric representation of the ballot may be encoded, both as a series of characters in the embodiment illustrated. Other formats for such information may also be employed. From this information, one may then check whether the ballot was properly counted with a publicly accessible website, for example.

The following discussion provides details of a particular embodiment of a voting system. Details of this embodiment may be combined with the various embodiments discussed above, and parts of the various embodiments discussed above may be incorporated into this specific embodiment. Accordingly, one may produce new embodiments incorporating features of various embodiments of this document which embody the invention event though not described specifically in this document. Statements about the embodiment in the following description should be understood to be limiting to this particular embodiment, and not to all embodiments generally.

The system is designed to address various acute problems by attempting to implement principles that have historically been the goals of democratic elections:

*Anonymity. The voter alone should decide whether and what to disclose about the choices made on the ballot. The voter should have the right to choose to disclose nothing, but the right to use and to disclose information about one's own vote is also an essential political right.

*Accuracy. There should be clarity in the presentation and marking of ballots, so that they represent the true intent of the voter, and there should be zero tolerance for errors in the recording and counting of votes.

*Transparency. Voters should be able to see and to understand all aspects of the system, and the maximum possible amount of information about all votes cast, consistent with the principle on anonymity, should be made public.

*Confidence. Every election should be subject to quick, reliable and automatic verification, and there should be effective recourse in the event that the integrity of the system is shown to have been compromised.

The invention works by i) the consistent application of cryptographic certification of election information and results by the election authority and its agents, using election equipment and programs it deploys and ii) the timely and effective dissemination of certified material to voters, the public, poll watchers, law enforcement authorities and other interested parties. The disseminated material includes inputs to the election process by the election authorities, such as source and executable code and ballot templates and formats, and the output of the election process, including ballots cast anonymously by voters and tallies of those ballots.

A cryptographic certification should be impossible for anyone (other than the certifying party) to forge without detection, given the current state of computing technology. Examples of such certificates are encrypted messages generated by private/public key systems that have been widely tested by the crytographic community and digital signatures, such as those specified in the Digital Signature Standard of the National Institute of Standards and Technology. All references in this document to a digital signature should be understood to refer to at least such a cryptographic certification, and is not dependent on the particular embodiment.

Effective dissemination of certified material means that the certificates are readily accessible and readable.

Some technologies employed by the system to provide these features are public key signatures—an established method of verifying the integrity of documents—and the Internet and the World Wide Web, which can bring the public directly into the process of verification.

The system potentially elevates the role of voters to guarantors of the integrity of the system as well as decision makers. Like democracy itself, the system becomes more secure as individual participation and empowerment increases.

The system is intended to preserve familiar electoral procedures. For example, voters go to a local polling place to cast their ballots. While the system retains time-tested aspects of voting procedure, it also takes advantage of changes in the technology of voting. In an embodiment, all information is entered and stored in digital form and each ballot is uniquely tagged in a manner permitting it to be tracked but ensuring anonymity. Each collection of digital information, including individual ballots and entire voting sessions are cryptographically secured.

The system, in one embodiment, employs specially equipped Direct Recording Electronic (ATM-style) voting machines. Such a machine should be isolated to prevent tampering of any kind and would not require a hard drive, flash drive or other rewritable, nonvolatile memory, network port or wireless communication capability. All software could reside on ROMs and unexpected interruption of operation could be protected by battery backup. Both the advantages and the drawbacks of DREs have been well documented. The following features are also incorporated into the system in this embodiment:

1 All software, both source and executable, including templates for the casting and printing of ballots, are published on the Internet prior to election day. The system requires publication, with the source code and executable code, of a sufficiently detailed description of the method of deriving the executable from the source to permit a third party to duplicate the result, including the computing platform, tools and settings. The required tools must be generally available."

2 At the beginning of an election session each voting machine is initialized by the election authority with the appropriate software, including the applicable ballot template.

3 At the beginning of the election session, each voting machine generates a pair of private/public cryptographic keys (signing and verifying keys). The verifying key is written to the machine's write-once record.

4 The local election judges sign in a voter and authorize the casting of a single ballot.

5 The voting machine assigns a random ID to the ballot.

6 The voter enters a vote on the voting machine with opportunities to review and modify the vote at any time in the process on paper or on the screen.

7 The voting machine calculates a unique digital signature for the ballot, and makes the signature along with the ID an integral part of the ballot.

8 The voting machine records the ballot on a write-once storage medium and prints two copies of the ballot each including the ID and the digital signature. One copy is retained for the election officials; the voter gets the other.

9 If there is another voter, the procedure loops back to signing in the next voter.

10 After all votes have been cast, the voting machine freezes the write-once storage medium and digitally signs the entire session.

11 Digitally signed print outs displaying a list of all unique identifiers, the verifying key, a tally for each candidate and/or question on the ballot and the serial number and digital signature of the program source from each machine are produced for the election authority and for each poll watcher.

12. The private ("signing") signature key, never having been recorded on any persistent medium is discarded.

13 The ballots recorded on the voting machines' write-once storage medium, together with the verifying key for them, are downloaded to a single local computing device, totaled and reported to the central election authority.

14 The central election authority publishes all ballots and verifying keys on the Internet.

The system in this embodiment builds on DREs' advantages to correct their disadvantages. One advantage of a DRE is that it is programmable. This means that it can accommodate any size or style ballot, in any language. Good design can make it very clear and user-friendly. It can be tailored to enable voting by the physically- or vision-impaired. It potentially eliminates overvotes, in which the voter marks the ballot for two candidates for the same office. And it potentially greatly reduces the frequency of undervotes, in which the voter unintentionally fails to vote on some matter. Undervotes, in particular, have been a major source of the failure of traditional ballots to correctly record voter intentions.

A disadvantage of the DRE is that it does not provide any way to check that the votes cast are correctly recorded or that the votes cast are accurately tallied. The fact that a DRE is programmable is one source of this profound defect: computer programs may give wrong results, either by design or by accident. It is, in most cases, impossible to guarantee the correctness of a computer program. The public is aware of the consequences of programming errors ("bugs") from such examples as the "crashes" of their personal computers and by news reports of programming errors that have destroyed space exploration missions. There is substantial evidence that DRE errors have already altered the outcome of elections in the United States.

Requiring that the computer source code used in a DRE be available for public inspection would help with this problem, but would not solve it. Among other things, it would leave unresolved the problem of assuring that the code actually running on the voting machines was the same as that submitted for public review. This embodiment requires that the source and executable code of all computer programs, both application and control, used in the election be published and be made available for public inspection, that the election authority audit the actual code used on the machines before and after the election and that the code executing on the voting appliance be testable for authenticity at any time during the course of the voting session. A second problem is that DREs store information in electronic form. Electronic information is easily altered in ways that may be difficult or impossible to detect, unless special steps are taken to protect it.

The embodiment of this system is potentially vendor-neutral. Any manufacturer may produce machines and programs adhering to this voting protocol, making it less likely that voting machine manufacture will be monopolized. This should help keep down the costs of the system and preclude the possibility of partisan ownership of crucial components of the election apparatus. The machine could be a commodity computer, which would have the advantage of permitting it to be a multi-purpose machine. Or it could be a dedicated machine, with no disk drive or other persistent memory other than the write-once device, capable of executing a program on a ROM chip, which would have desirable security features. Other machines may also be used.

On election day each voting machine publicly displays a constantly updated count of the number of votes cast, confirming that each voter casts one, and only one, vote and that this vote has been recorded. This permits an ongoing comparison of the number of votes cast with the number of applications for ballots.

The system adds five elements to the election process, building on the fact that a DRE is a programmable device (that is, a computer) and that the votes cast on it are available in electronic form. These measures potentially make it possible for each voter to confirm that their vote was correctly recorded and counted.

First, the voting machine assigns a unique random identifier to each ballot that is cast and records this identifier on each representation of the ballot (paper or electronic). This random identifier is similar to the identifier given to a rental car or airline reservation. It does not compromise the anonymity of the voter because it is not based on any information about the voter.

Second, the voting machine calculates a unique digital signature for each ballot, based on the ballot's random identifier and the way the voter has marked the ballot. The digital signature is calculated using the Digital Signature Standard approved by the U.S. government, or other secure scheme for generating digital signatures. The Digital Signature Standard is already in widespread use for applications requiring high security. The digital signature provides evidence that the vote was cast on a particular machine in a particular election session and has not been altered.

According to one type of approach, a digital signature is associated with a pair of numbers called keys: one key in the pair is used to sign a digital document, the other is used to verify the signature. While the second key verifies the signature, it also verifies that the signed document has not been altered. In the cryptographic literature these are usually referred to as the private key and the public key, respectively.

Each voting machine generates a private/public (signing/verifying) pair of keys at the beginning of a voting session. It immediately records the verifying key on its write-once storage medium. It uses the signing key throughout the session to sign each ballot that is cast. According to one approach, the voting machine does not write down the signing key on paper or records it on any other persistent storage medium; nor does it communicate the signing key or reveal it to either the voter or the voting authorities. The machine is not connected to any network. The signing key is discarded at the end of the voting session.

Third, the voting machine records each completed ballot to a location on a write-once storage medium in a manner which makes it impossible to determine the order in which the votes were cast. Information that is recorded on a write-once storage medium cannot be erased or altered. An example is a write-once disk that is written to using a CD burner. At worst, the information may be corruptible under such circumstances.

Fourth, the voting machine generates two paper copies of the voter's completed ballot. One is retained by the voting authority, and can be used to conduct an election audit, if necessary. The other is given to the voter. Special features potentially guard against use for vote buying.

Fifth is the transparent reporting feature of the system. After the polls close, print outs are produced for the election authority and each of the poll watchers from each machine detailing all unique identifiers, the verifying key, a tally for each candidate and/or question on the ballot and the serial number and digital signature of the program source. The voting machine with the write-once storage medium and all other read and/or write devices still locked inside is returned to the central election authority. Then the central election authority publishes the entire set of ballots on the Internet so that they are available to the public at large. The set of verifying keys are published along with the ballots. The complete set of ballots and verifying keys may be effectively and cheaply published using, for example, BitTorrent technology.

After the polls close and the ballots are published on the Internet, a voter may go on line and look up the ballot that matches the unique identifier (that is, the "reservation number") on their ballot. The voter enters this number, and the election authority displays the corresponding ballot, which the voter may then check. The voter may also call up all the votes cast in a precinct or other electoral jurisdiction.

The process of checking that a ballot has been properly counted is potentially similar to checking on the delivery of a package that has been barcoded and is electronically scanned at its destination. Indeed, the ballot identification number could easily be barcoded on each printed ballot, permitting it to be read with a wand, just as bar codes on merchandise are read at a check-out counter.

Transparency is a feature of the system that potentially enables the public to confirm the integrity of the process as a whole. The public verification may begin to take place as soon as the ballots are published.

Each voter may check their own vote, and large numbers may be expected to do so in an elementary exercise of democracy. This alone makes it unlikely that any systematic alteration or discarding of votes will go undetected. A single lost or altered ballot may be all that is required to trigger a full-scale election audit. Anyone can prove that a ballot has been lost or altered by producing a printed ballot that can be verified by one of the published verifying keys, but which is absent from the published ballots.

The ability to check the number of ballots cast in each precinct against the number of ballots issued by the voting authority provides a safeguard against electronic ballot-box stuffing. The two numbers must be equal—or something is clearly wrong. A paper trail including each unique identifier, verifying key, a tally of the vote for each candidate and/or question on the ballot and the serial number and digital signature of the program source is produced to prevent wholesale replacement of the votes cast on each machine.

The ability to examine each ballot and ascertain that it is authenticated by the digital signature of the corresponding voting machine provides a second guarantee against votes being added or altered.

The ability to download all ballots and conduct an independent count of the votes on each ballot item potentially prevents tallying errors from going undetected.

Voting is a compact between voters and government. The system potentially protects both. The digital signatures employed by the system protect against vote tampering or loss and simultaneously protect the voting system against mistaken or malicious charges of fraud. A charge that a particular ballot has been lost or altered is credible if—and only if—the charge is backed up by a paper version of that ballot that has been digitally signed by a voting machine, which can be determined by the use of the corresponding published verifying keys. The Digital Signature Standard produces a signature that is considered, for all practical purposes, to be unforgeable, and it undergoes periodic public review to assure that it remains secure in the face of advances in computing and cryptography.

A requirement that Direct Recording Electronic machines produce a paper trail would substantially enhance confidence in the security of the election process. However, a paper trail alone is potentially inadequate for two reasons. First, a paper trail is useless if the paper ballots are not counted, and such a count occurs only in an official audit. Triggering an audit is generally a difficult, expensive, time-consuming process. Courts tend to be very reluctant to overturn elections, even those with many irregularities. In practice there are few audits. The system builds in direct voter verification of the integrity of every election, reliably detects any material error that may occur, and triggers the use of the paper trail in the case of a single provably lost or altered vote.

Second, it is impossible, using an ordinary DRE with a printer attached, to guarantee that the paper ballots produced correspond to the electronic votes cast. This is a fundamental defect of a paper record of an electronic vote. It is entirely possible for a computer program to display one thing to the voter and to record something different.

The problem occurs at the interface between the digital and the physical parts of a hybrid system.

The system potentially remedies this problem by building in checks that are integral to the digital form in which the ballot is originally cast, namely, a random identifier ("reservation code") and a digital signature that are unique to each ballot and that stick to the ballot and a means of testing the executing code to ensure it authenticity. This, together with the public reporting of the ballots, enables the voter to directly check the ballot after it has been cast and recorded.

Giving the voter a paper record of the ballot is a step toward voter empowerment, because it contains a digital signature that proves that it was legitimately cast. This record does not violate the secrecy of the vote—it remains the decision of the voter alone whether to disclose how she or he voted. But possession of the paper record of the ballot does permit the voter to take ownership of their own vote in a qualitatively new way—namely, by assuring that it was not tampered with after it was cast. The right to vote is meaningless unless it is backed by the right to guarantee that the vote is properly counted.

The right of the voter to ensure that every vote has been recorded and tallied as cast potentially far outweighs the traditional argument for denying voters a copy of their ballot: that a vote receipt would enable vote buying or vote coercion. However, it is not necessary to make this tradeoff; the system both potentially guarantees a correct count of votes and suppresses vote buying.

The rising number of absentee ballots that are cast by mail or otherwise outside the normal controls of the polling place creates widespread new opportunities for vote buying or other corruption of the electoral process. Whenever a vote is cast outside of the guaranteed secrecy of a polling booth, a would-be vote buyer may actually be able to take physical control of the casting of the ballot. The system eliminates this practice; all votes, including absentee ballots, are cast on machines in the system under conditions established by law.

Traditionally, the prohibition on voter receipts stems from a fear that a proof of ballot content would facilitate vote buying, since the vote buyer would be assured of a return on investment. The system eliminates that certainty and, in practice, reduces the value of a purchased vote to the level of a vote purchased with no receipt, or less.

Because the system requires the publication in advance of the election of all source and executable code, including ballot formats and output templates, anyone with a computer could produce counterfeit ballots at almost no cost and in unlimited numbers, flooding the streets with phony ballots. Such counterfeits could not be detected until after the election was completed and the verifying keys of legitimate voting sessions were published. Until then, a legally cast ballot would be indistinguishable from a counterfeit. The would-be buyer of votes would be confronted with a large number of counterfeit offers, driving down the return on investment in bought votes to near zero.

To ensure that the purchased votes were not forgeries, the vote buyer would have to collect vote receipts (or key information from the receipt) and record the identity of the seller, while asking the seller to forgo payment until after the election results had been published. The seller would have no means of enforcing the completion of the transaction. The inescapably low level of trust between buyer and seller would make this form of vote buying unlikely.

Even worse for the vote buyer, the digital signature provides a way of marking each forged vote receipt, much like marking the bills used to pay off a ransom. This would provide a powerful new tool to law enforcement officials to pressure street-level operatives to turn in the political boss who financed the vote-buying operation.

Receipts presented for the first time for payment after the election would similarly be of no value, since indistinguishable duplicate receipts could readily be produced from the published results. Counterfeit ballots would present no threat to the integrity of the election process proper because digital signatures are potentially unforgeable. Counterfeit ballots would be easily and reliably detected after the publication of the verifying keys. Widespread knowledge of the worthlessness of counterfeit receipts after the publication of the verifying keys would potentially serve to enhance popular confidence in the integrity of the electoral system.

Absentee voting has become a much more widespread practice recently. Advance votes cast at public polling places account for a substantial percentage of votes in some states. U.S. citizens abroad, both military and civilian, may also vote by absentee ballot. The mailed paper ballot system of absentee voting has often prevented these votes from being counted in a timely way and has sometimes led to uncertainty and controversy over the accuracy of the count.

Absentee ballots in this system may only be cast in advance on a voting machine in a public polling place in the voter's home state, or on a voting machine in a U.S. embassy or any location with a sufficient concentration of voters abroad. In any case, duly authorized election officials control the polling place.

The voting procedure for absentee ballots differs from in-person election-day voting only in the following respects:

Each ballot is recorded on a separate write-once medium, which remains in the possession of the voting authority.

The ballots, both electronic and paper, are marked as "receipt for absentee ballot."

The voting authority's copy of the paper ballot is placed in sealed Envelope A. Envelope A, along with the write-once copy of the ballot, is placed in sealed Envelope B. Envelope B, along with the voter's application for an absentee ballot, is placed in sealed Envelope C. Envelope C is delivered to the voter's local jurisdiction. It is mailed to the local jurisdiction in the case that the polling place is a U.S. embassy or other remote polling place.

On election day, the local election officials open Envelope C, examine the application for ballot and determine if the voter is qualified. If the application is approved, the write-once medium is removed from Envelope B and processed through a voting machine. This voting machine produces a new digital signature for the ballot, drops a paper copy of the newly signed ballot directly into the ballot box and writes the newly signed ballot to its write-once record. The absentee ballot then becomes indistinguishable from non-absentee ballots cast on that machine. The original paper ballot in Envelope A remains sealed, to be used only if needed for an audit of the paper trail. If the local voting authority finds the voter unqualified, the unique random identifier is posted to the Internet with the notation "Voter not qualified." A disqualified ballot is, of course, not tallied.

The system handles provisional votes in a manner similar to absentee ballots, except that they are processed only after election day. This is preferably done in accordance with applicable election law. The provisional ballots may be segregated on a separate write-once medium for this purpose, for example.

One skilled in the art will appreciate that although specific examples and embodiments of the system and methods have been described for purposes of illustration, various modifications can be made without deviating from the present invention. For example, embodiments of the present invention may be applied to many different types of databases, systems and application programs. Moreover, features of one embodiment may be incorporated into other embodiments, even where those features are not described together in a single embodiment within the present document.

What is claimed is:

1. A method comprising:

creating a private key and a public key cryptographic key pair;

generating a unique and random identifier for a voter's vote;

accepting an election vote from said voter;

electronically signing said vote and said identifier with said private key to create a digital signature;

providing, as part of said method's standard process, said vote and said identifier in a human readable format to said voter and providing, as part of said method's standard process, said digital signature to said voter;

generating a second unique and random identifier for a second voter's vote;

accepting a second election vote from said second voter;

electronically signing said second vote and said second identifier with said private key to create a second digital signature;

providing said second vote and said second identifier in a human readable format to said second voter and providing said second digital signature to said second voter;

publishing said public key on an internet;

publicly providing information on said internet that associates together:

(i) said voter's vote in a human readable format, (ii) said identifier in a human readable format, and (iii) said digital signature wherein, said voter's vote is verifiable with said digital signature and said public key;

publicly providing information on said internet that associates together:

(iv) said second voter's vote in a human readable format, (v) said second identifier in a human readable format, and (vi) said second digital signature wherein, said second voter's vote is verifiable with said second digital signature and said public key;

in response to receiving a request from said internet containing said identifier, providing (i), (ii) and (iii) above through an internet communication;

in response to receiving a second request from said internet containing said second identifier, providing (iv), (v) and (vi) above through a second internet communication.

2. The method of claim 1 further comprising in response to receiving a request from said internet for an electoral jurisdiction's election data, providing through a second internet communication a complete set of votes, identifiers, digital signatures and public keys for said electoral jurisdiction.

3. The method of claim 1 further comprising storing said identifier, said digital signature and said voter's vote into a write once read many times (WORM) storage device.

4. The method of claim 3 wherein said identifier, said digital signature and said voter's vote are assigned at a randomly assigned portion of said WORM storage device.

5. The method of claim 1 further comprising erasing said private key after cessation of voting activities.

6. The method of claim 5 further comprising storing said private key only on volatile memory and not disclosing or communicating said private key.

7. The method of claim 1 further comprising generating a new private key and public key pair for each voting session.

8. The method of claim 1 wherein first and second instances of said voter's vote, said identifier and a tangible representation of said digital signature are respectively provided to said voter on a first piece of paper and a voting authority on a second piece of paper.

9. The method of claim 1 wherein said voter's vote is accepted through an electronically generated user interface.

10. The method of claim 1 further comprising tallying said first and second voters' votes.

11. The method of claim 1 further comprising digitally signing results of an election session.

12. The method of claim 1 further comprising accepting marked provisional, early and absentee ballots for subsequent casting.

13. The method of claim 1 further comprising providing information encrypted with said private key to verify said private key without divulging said private key.

14. A computer program product including program code stored on one or more computer readable media, said program code to perform a method, said method comprising:

recognizing creation of a private key and a public key cryptographic key pair;

causing a unique and random identifier to be generated for a voter's vote;

accepting an election vote from said voter through an electronically rendered user interface;

electronically signing said vote and said identifier with said private key to create a digital signature;

as part of said method's standard process, causing said vote and said identifier to be provided in a human readable format to said voter and, as part of said method's standard process, causing said digital signature to be provided to said voter;

causing a second unique and random identifier to be generated for a second voter's vote;

accepting a second election vote from said second voter through said interface;

electronically signing said second vote and said second identifier with said private key to create a second digital signature;

causing said second vote and said second identifier to be provided to said second voter in a human readable format and causing said second digital signature to be provided to said second voter;

publishing said public key on an internet;

publicly providing information on said internet that associates together:

(i) said voter's vote in a human readable format, (ii) said identifier in a human readable format, and (iii) said digital signature wherein, said voter's vote is verifiable with said digital signature and said public key;

publicly providing information on said internet that associates together:

(iv) said second voter's vote in a human readable format, (v) said second identifier in a human readable format, and (vi) said second digital signature wherein, said second voter's vote is verifiable with said second digital signature and said public key;

in response to receiving a request from said internet containing said identifier, providing (i), (ii) and (iii) above through an internet communication;

in response to receiving a second request from said internet containing said second identifier, providing (iv), (v) and (vi) above through a second internet communication.

15. The computer program product of claim 14 wherein said method further comprises in response to receiving a request from said internet for an electoral jurisdiction's election data, providing through a second internet communication a complete set of votes, identifiers, digital signatures and public keys for said electoral jurisdiction.

16. The computer program product of claim 14 wherein said method further comprises causing a random location to be identified for storing said identifier, said digital signature and said voter's vote into a write once read many times (WORM) storage device.

17. The computer program product of claim 14 wherein said method further comprises erasing said private key after cessation of voting activities.

18. The computer program product of claim 14 wherein said method further comprises causing said private key to be stored only on volatile memory and not disclosing or communicating said private key.

19. The computer program product of claim 14 wherein said method further comprises causing a new private key and public key pair to be generated for each voting session.

20. The computer program product of claim 14 wherein said method further comprises tallying said first and second voters' votes.

21. The computer program product of claim 14 wherein said method further comprises digitally signing results of an election session.

22. A voting machine system, comprising:

a) a computer program product including program code stored on one or more computer readable media, said program code to perform a method, said method comprising:

recognizing creation of a private key and a public key cryptographic key pair;

causing a unique and random identifier to be generated for a voter's vote;

accepting an election vote from said voter through an electronically rendered user interface;

electronically signing said vote and said identifier with said private key to create a digital signature;

as part of said method's standard process, causing said vote and said identifier to be provided in a human readable format to said voter and, as part of said method's standard process, causing said digital signature to be provided to said voter;

causing a second unique and random identifier to be generated for a second voter's vote;

accepting a second election vote from said second voter through said interface;

electronically signing said second vote and said second identifier with said private key to create a second digital signature;

causing said second vote and said second identifier to be provided to said second voter in a human readable format and causing said second digital signature to be provided to said second voter;

publishing said public key on an internet;

publicly providing information on said internet that associates together:

(i) said voter's vote in a human readable format, (ii) said identifier in a human readable format, and (iii) said digital signature wherein, said voter's vote is verifiable with said digital signature and said public key;

publicly providing information on said internet that associates together:

(iv) said second voter's vote in a human readable format, (v) said second identifier in a human readable format, and (vi) said second digital signature wherein, said second voter's vote is verifiable with said second digital signature and said public key;

in response to receiving a request from said internet containing said identifier, providing (i), (ii) and (iii) above through an internet communication;

in response to receiving a second request from said internet containing said second identifier, providing (iv), (v) and (vi) above through a second internet communication;

b) processor circuitry implemented on one or more semiconductor chips to process said program code;

c) one or more volatile memory resources coupled to said processor circuitry, said private key stored only in said one or more volatile memory resources;

d) write once read many (WORM) storage resources coupled to said processor circuitry:

said first voter's vote, said first identifier and said first digital signature to be stored in a first randomly assigned portion of said WORM storage resources;

said second voter's vote, said second identifier and said second digital signature to be stored in a second randomly assigned portion of said WORM storage resources.

23. The voting machine system of claim 22 wherein said method further comprises digitally signing results of an election session.

24. A voting machine system, comprising:

a) one or more semiconductor chips to perform the following method:

creating a private key and a public key cryptographic key pair;

generating a unique and random identifier for a voter's vote;

accepting an election vote from said voter;

electronically signing said vote and said identifier with said private key to create a digital signature;

as part of said method's standard process, providing said vote and said identifier in a human readable format to said voter and, as part of said method's standard process, providing said digital signature to said voter;

generating a second unique and random identifier for a second voter's vote;

accepting a second election vote from said second voter;

electronically signing said second vote and said second identifier with said private key to create a second digital signature;

providing said second vote and said second identifier in a human readable format to said second voter and providing said second digital signature to said second voter;

publishing said public key on an internet;

publicly providing information on said internet that associates together:

(i) said voter's vote in a human readable format, (ii) said identifier in a human readable format, and (iii) said digital signature wherein, said voter's vote is verifiable with said digital signature and said public key;

publicly providing information on said internet that associates together:

(iv) said second voter's vote in a human readable format, (v) said second identifier in a human readable format, and (vi) said second digital signature wherein, said second voter's vote is verifiable with said second digital signature and said public key;

in response to receiving a request from said internet containing said identifier, providing (i), (ii) and (iii) above through an internet communication;

in response to receiving a request from said internet for an electoral jurisdiction's election data, providing through a second internet communication a complete set of votes, identifiers, digital signatures and public keys for said electoral jurisdiction;

b) one or more volatile memory resources coupled to said processor circuitry, said private key stored only in said one or more volatile memory resources;

c) write once read many (WORM) storage resources coupled to said processor circuitry:

said first voter's vote, said first identifier and said first digital signature to be stored in a first randomly assigned portion of said WORM storage resources;

said second voter's vote, said second identifier and said second digital signature to be stored in a second randomly assigned portion of said WORM storage resources.

25. The voting system of claim 24 wherein said voting system further comprises one or more storage media storing program code to implement said method, said semiconductor chips having processing circuitry to process said program code.

* * * * *